United States Patent
Franklin

[11] Patent Number: 6,073,736
[45] Date of Patent: Jun. 13, 2000

[54] VALVE ASSEMBLY FOR A SUSPENSION SYSTEM FOR A WHEELED VEHICLE

[75] Inventor: Joseph A. Franklin, Richfield, Conn.

[73] Assignee: Cannondale Corporation, Bethel, Conn.

[21] Appl. No.: 09/373,986

[22] Filed: Aug. 16, 1999

Related U.S. Application Data

[62] Division of application No. 08/816,532, Mar. 13, 1997, Pat. No. 5,971,116.

[51] Int. Cl.[7] ................... F16F 9/34; F16F 9/50; F16K 31/02
[52] U.S. Cl. ................... 188/322.15; 188/282.4; 137/625.3; 137/625.38; 251/129.11
[58] Field of Search ............... 188/322.15, 322.22, 188/322.13, 282.1, 282.2, 282.3, 282.4, 282.8, 283, 316, 317, 299.1; 137/625.3, 625.38; 251/129.11, 205

[56] References Cited

U.S. PATENT DOCUMENTS

| | | | |
|---|---|---|---|
| 4,483,369 | 11/1984 | Akagi et al. | 137/625.3 |
| 4,850,461 | 7/1989 | Rubel | 188/322.15 |
| 5,172,929 | 12/1992 | Butsuen et al. | 188/282.4 |
| 5,351,935 | 10/1994 | Miyoshi et al. | 251/129.11 |

*Primary Examiner*—Robert J. Oberleitner
*Assistant Examiner*—Devon Kramer
*Attorney, Agent, or Firm*—Pennie & Edmonds LLP

[57] ABSTRACT

A active, hydraulic suspension system for a wheeled vehicle is disclosed. The system utilizes an on-board damper controller, a damper having a pair of telescoping tubes and a motor-adjusted hydraulic channel, a position and direction sensor to achieve comprehensive control over dampening performance. The rider is allowed to change the damping performance by selecting a control map which dictates the damping force applied based on the position, direction of motion, and velocity of one tube relative to the other. The system continuously varies the amount of dampening in real time in response to the terrain conditions, as determined by a sensor. A processor in the damper controller accepts the sensor input and outputs motor control signals based on information existent in the control map. The motor adjusts the flow of a viscous liquid through the hydraulic channel of the damper in accordance with the control signals received from the damper controller to achieve the desired damping performance. An external computer may be used to load control maps to the damper controller for subsequent selection by a rider.

3 Claims, 12 Drawing Sheets

VALVE ASSEMBLY FOR A SUSPENSION SYSTEM FOR A WHEELED VEHICLE

CROSS REFERENCE TO RELATED APPLICATIONS

This application is a division of application Ser. No. 08/816,532, filed Mar. 13, 1997, now U.S. Pat. No. 5,971,116.

FIELD OF THE INVENTION

The present invention relates generally to wheel suspensions and more particularly to wheel suspensions with motorized damping control on vehicles such as bicycles.

BACKGROUND OF THE INVENTION

Suspension systems for vehicles improve the handling and control of the vehicle by absorbing energy associated with uneven terrain due to bumps, depressions, obstacles, and other such features. Various forms of hydraulic suspension systems have been designed to meet the handling and control requirements of the rider. These systems typically consist of an arrangement of two telescoping tubes, two chambers for holding a viscous fluid, seals for keeping the viscous fluid within the chambers, a damper assembly which separates the two chambers, and a damper valve which regulates the flow of the fluid from one chamber to the other.

In a typical arrangement, an outer tube is fastened to the damper assembly at a point on the upper portion of the bicycle and fits over a lower inner tube which is fastened to a point on the lower portion of the bicycle. The tubes are arranged to allow them to slide axially in a telescoping fashion in relation to each other. The tubes encompass two chambers which hold a viscous fluid. A seal surrounds the upper portion of the lower tube to keep the fluid within the chambers.

When the vehicle passes over a bump, the outer tube slides axially in a telescoping fashion toward the inner tube. The viscous fluid flows from the lower chamber through the damper valve to the upper chamber to allow the outer tube and damper assembly to slide toward the inner tube. During the subsequent expansion phase, the outer tube slides axially in a telescoping fashion away from the inner tube. In the expansion phase, the viscous fluid flows in the opposite direction through the damper valve to allow the outer tube to move away from the inner tube.

Hydraulic suspension systems exhibit a typical dampening performance. If a small input compressive force is slowly and continuously applied to the system, the viscous fluid will flow through the damper opening and the outer and inner tubes will move axially toward each other. Conversely, if a large input compressive force is applied suddenly to the system, the viscous fluid will not be able to flow through the opening fast enough to allow a rapid relative movement of the two tubes. Accordingly, hydraulic suspension systems exhibit more resistance to large, sudden forces than to small, slow forces.

While hydraulic suspension systems typically exhibit the dampening performance described above, the actual dampening performance of a particular suspension system is a function of the physical characteristics of that system. The amount of resistance exhibited by the hydraulic suspension system depends on the rate at which the viscous fluid can flow through the damper valve from the lower chamber to the upper chamber. A suspension system will exhibit less resistance or stiffness in response to a bump if the viscous fluid is permitted to flow more easily through the damper valve. Thus, a hydraulic suspension system with a larger opening between the two chambers will offer less resistance than another system which has a smaller opening.

The prior art has examples of hydraulic suspension systems with telescoping tubes with added features which enable the system to modify the damping performance of the device to a limited degree. As explained in U.S. Pat. No. 4,971,344 to Turner, the suspension system can be designed to exhibit greater resistance to low input forces which could be produced from the pedal force of the rider and lower resistance to high input forces associated with a large bump. In this arrangement, the damper opening is blocked with a plate-like shim until the fluid pressure in the lower chamber becomes greater than the resistance provided by a spring which holds the plate over the opening. This scheme allows the suspension system to absorb energy associated with bumps while preventing the system from absorbing energy associated with pedaling.

As indicated by this discussion, the hydraulic suspension systems in the prior art have two major limitations. First, they have limited, static control over the dampening performance. For example, prior art hydraulic suspension systems exhibit smaller resistance throughout their operating region by using a larger opening between the two chambers. Similarly, the Turner suspension system exhibits stepped resistance, one level of resistance when the input force is lower than a certain threshold value and a second, higher level of resistance when the input force exceeds the threshold value. Second, the prior art offers the rider only a limited ability to change the dampening performance of the suspension system to match the rider's preference. For example, the rider of the Turner suspension system can adjust the gas pressure in the upper chamber to vary the resistance.

SUMMARY OF THE INVENTION

In contrast to the prior art, the present invention exhibits comprehensive control over the dampening performance of the suspension system. Further, the rider can easily change the dampening performance in accordance with his or her preference. The present invention utilizes an on-board damper controller and a motor to continuously vary the opening of an adjustable damper valve in response to terrain conditions which are sensed by a sensor. The rider changes the dampening performance of the device by specifying and selecting control maps which are used by the damper controller to vary the resistance of the system.

It is an object of the present invention to provide an active suspension system which continuously varies the amount of dampening in response to the terrain in real time in accordance with the operator's preferences.

It is another object of the present invention to determine the terrain condition by sensing the relative position and relative velocity of the two telescoping tubes.

It is another object of the present invention to determine a dampening control from the relative position and relative velocity of the two telescoping tubes.

It is another object of the present invention to enable the operator to define a set of functions which map the relative position and relative velocity of the two telescoping tubes to a dampening control using an external computer.

It is another object of the present invention to enable the operator to adjust the dampening performance of the active suspension system by communicating the functions from the external computer to the damper controller and by selecting one of the functions.

It is another object of the present invention to determine the dampening control from the relative position and relative velocity of the telescoping tubes with the damper controller using the function selected by the operator.

It is another object of the present invention to control the flow of a viscous liquid through a channel in the damper with a lightweight motor to achieve a dampening performance in accordance with the determined dampening control.

These and other objects of the present invention are achieved by providing an active suspension system comprising a damper having a pair of members which telescope relative to one another and a motor associated with these members, a position sensor which gauges the relative positions of the two members, a damper controller arranged to process the position information from the sensors and output control information to selectively operate the motor, and a damping system operatively engaged to the motor for controlling the force applied by the suspension system in response to the position data and in accordance with the operator's preferences.

DESCRIPTION OF THE PREFERRED EMBODIMENT

Figure 1:
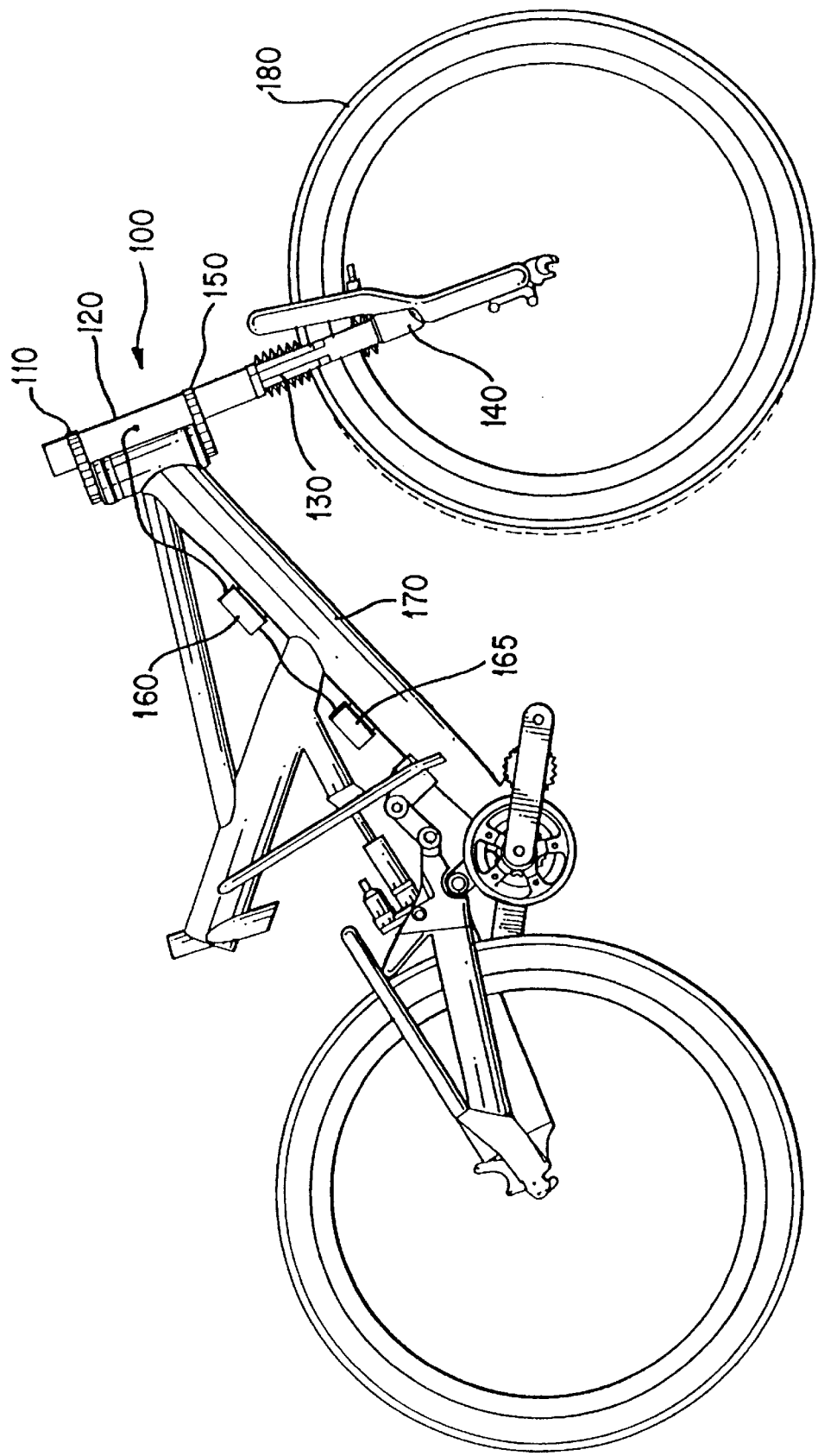
FIG. 1 shows the invention installed on a bicycle.

FIG. 1 shows the active suspension system 100 of the present invention, installed on a bicycle. The active suspension system comprises an outer tube 120 which is secured to a bicycle steering tube (not shown) by a top bracket 110 and a bottom bracket 150. An inner tube 130 is arranged in a telescoping fashion with respect to the outer tube 120. The lower end of the inner tube 130 is connected to a unitary front fork 140 which is used to attach a front wheel 180 to the bicycle steering tube. As subsequently explained, a damper is mounted within the tube assembly 120, 130. A damper controller 160, which controls the dampening performance of the damper, is connected to the bicycle frame 170.

A power source, preferably a battery pack 165, is mounted on the bicycle frame 170. It supplies power to the damper and is connected by wiring to the damper controller. Alternatively, the battery pack may be located in the damper controller unit, as discussed below. Also, the battery may be connected directly to a motor housed within the outer tube 120, in which case a logical control signal from the damper controller turns the motor on and off. Instead of a battery, the power source may be provided by propulsion of the bicycle itself, by means of a small generator driven by one or both of the bicycle wheels.

Figure 2:
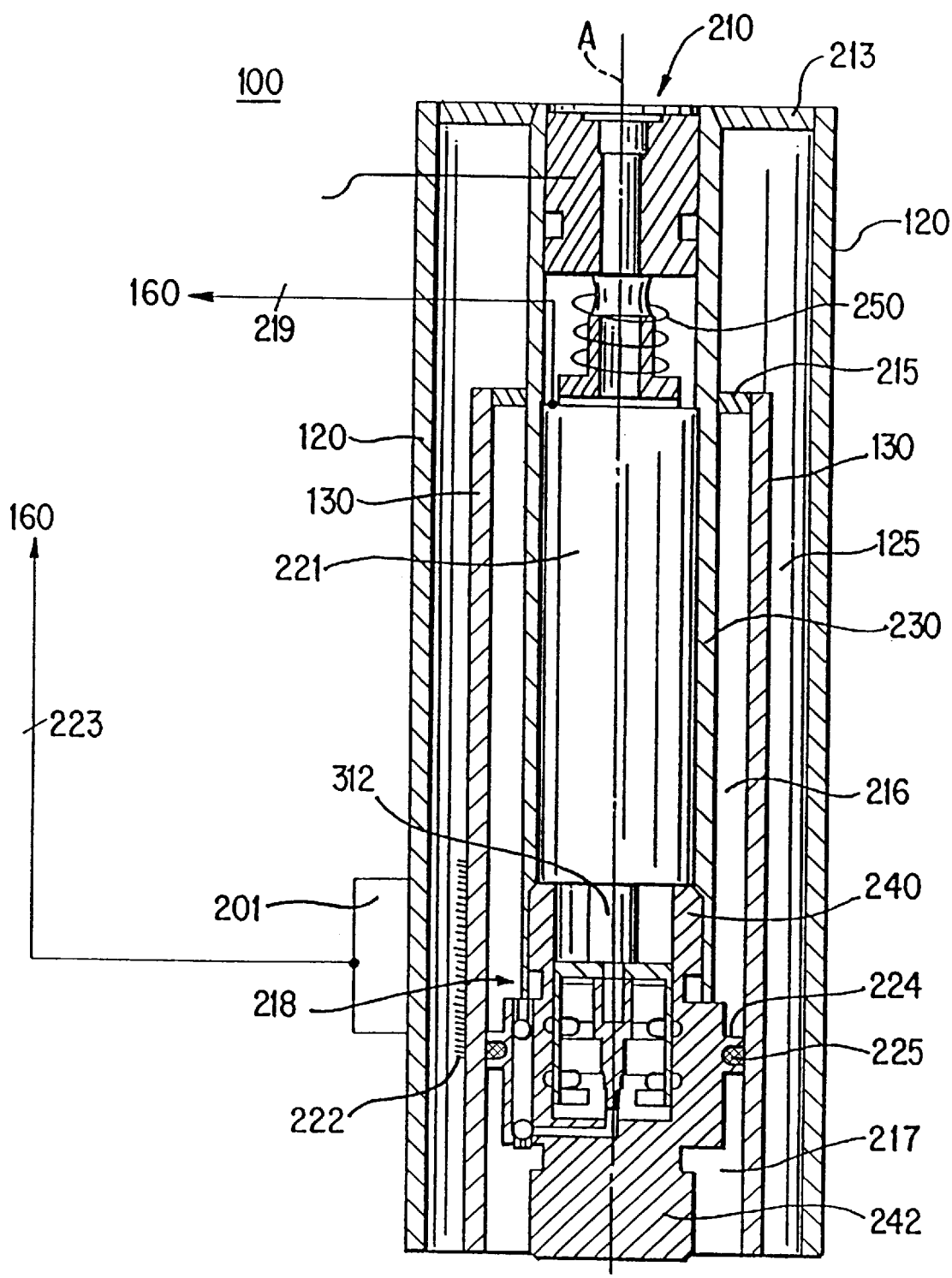
FIG. 2 is a cross-sectional view of the damper.

FIG. 2 shows a cross-sectional view of the active suspension assembly 100. The assembly has a longitudinal axis A along which many of its components move. The assembly comprises an outer tube 120 which is fastened to a damper assembly 210 by means of a collar 213.

The outer tube 120 is coaxially aligned with an inner tube 130, and the two are arranged to move in a telescoping fashion along the longitudinal axis A. Both the inner and outer tubes are essentially hollow cylinders, preferably formed from aluminum or other non-corrosive metal. The space 125 between the inner and outer tubes is typically filled with air. An exemplary outer diameter of the inner tube is 1.125 inches (28.58 mm) and an exemplary length of the inner tube 130 is 8.17 inches. The outer tube 120 comprises a hollow tube for mounting in the brackets 110 and 150. An exemplary outer diameter of the outer tube 120 is 1.5 inches (38 mm) and an exemplary length for the outer tube 120 is 7.66 inches (195 mm).

As shown in FIG. 2, the damper 210 comprises an upper piston shaft 230 and a piston connect shaft 240. A lower portion 242 of the piston connect shaft is operatively engaged to additional damping means such as mechanical air shocks, whose structure is familiar to those skilled in the art. The damper has an upper chamber 216 and a lower chamber 217, both of which hold a viscous liquid such as SAE 5 weight oil. A seal 215 formed between the inner tube 120 and an uppermost portion of the upper piston shaft confines the viscous liquid within the upper chamber 216. The two chambers 216, 217 are separated by an O-ring 225 which occupies a groove in a flange 224 integrally formed on a circumferential portion of the piston connect shaft 240. The O-ring seal prevents oil leakage between the upper and lower chambers.

The damper assembly 210 also includes a motor 221 which is biased by a pre-biasing assist spring 250. The motor 221 is provided with a movable motor shaft 312 arranged to move along the longitudinal axis A. The motor shaft 312 is operatively engaged to other components such that it controls a damper valve 218 which, in turn, controls the flow of viscous liquid between the two chambers 216, 217. The motor 221 is selectively activated by the damper controller 160 via control line 219. As described further below, damper controller 160 selectively turns the motor 221 on and off such that the motor shaft 312 is driven in a predetermined direction based on the polarity of the signal from the damper controller 160. The magnitude and/or duration of this signal controls the speed of the motor and the length of travel.

An optical sensor 201, mounted on the outer tube 120, and a light reflecting code strip 222, mounted on an outer surface of the inner tube, detect relative movement between the inner 130 and outer 120 tubes. Electrical connections 223 between the sensor 201 and the damper controller 160 power the sensor 201 and provide sensor output to the damper controller 160. Thus, the sensor 201 continuously provides position information to the damper controller 160.

In the preferred embodiment, the sensor 201 is a reflective optical surface mount encoder, available from Hewlett Packard (Part #s HCTL-2020 and HEDR-8000). The HCTL-2020 and HEDR-8000 integrated circuit pair illuminates the code strip 222 with a single light emitting diode (LED). The code strip 222 contains reflective marks separated by a predetermined distance. This integrated circuit set has an encoding resolution range from 2.76 lines/mm to 2.95 lines/mm.

The sensor 201 includes a photodetector integrated circuit which receives the reflected light pattern and outputs two waveforms. A first output waveform outputs a pulse for each reflecting mark detected. Counting the number of pulses relative to an initial value gives position information about the sensor relative to the code strip 222. A second output waveform encodes the direction of movement of the sensor 201 with respect to the code strip 222. As the sensor 201 is attached to the outer tube 120 and the code strip 222 is attached to the inner tube 130, the second output waveform provides information as to the direction of movement of the outer tube 120 with respect to the inner tube 130.

Figure 3:
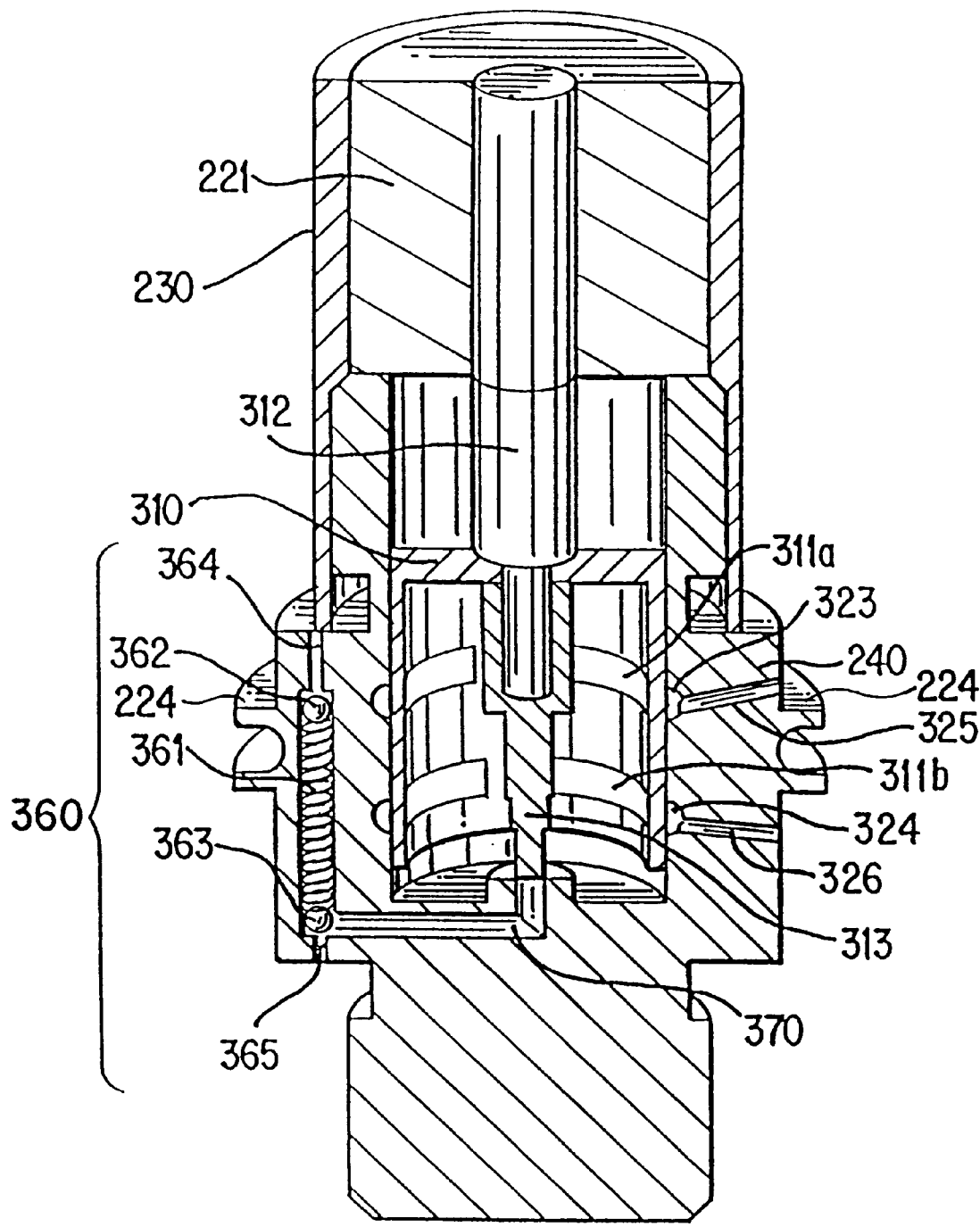
FIG. 3 is an enlarged cross-sectional view of the damper and sensor.

FIG. 3 shows an enlarged cross-sectional view of the damper valve 218. The damper valve 218 comprises a primary pathway for oil flow between chambers 216, 217, and an ancillary pathway which works in conjunction with the primary pathway. The primary pathway is facilitated by a substantially cylindrical spool valve 310 positioned below the motor 221. The movable motor shaft 312 is connected to the spool valve 310, moving the latter along the longitudinal axis when actuated by the damper controller 160. The ancillary pathway is facilitated by a feedback plunger 313 which is positioned within the cavity of the spool valve 310. Both pathways may be used when a bump is encountered by the suspension system.

The primary pathway is now described. The spool valve 310 is provided with a pair of slotted, circumferential orifices 311a, 311b. Similarly, the piston connect shaft 240 is provided with a pair of spaced apart grooves 323, 324 formed along an inner periphery thereof. One groove 323 is positioned above the flange 224, while the other groove 324 is positioned below the flange. Grooves 323, 324 communicate with chambers 216, 217 (as shown in FIG. 2), respectively via corresponding radial channels 325, 326. When a bump is encountered, oil in chamber 217 enters into channel 326, flows through groove 324 and its corresponding orifice 311b, then flows through the other orifice 311a, through groove 323, and out radial channel 325.

Thus, the slotted orifices 311a, 311b of the spool valve 310 and the grooves 323, 325 of the piston connect shaft 240 form a primary pathway for conveying the viscous fluid between the two chambers 217, 216. The viscous liquid flows from the lower chamber 216 to the upper chamber 217 during compression of the damper 210, i.e., the "downward stroke". The liquid flows in the opposite direction during expansion of the damper after a bump, i.e., during the "upward stroke".

The motor 221 controls the dampening performance of the damper 210 by moving the spool valve 310 with respect to the piston connect shaft 240 to adjust the alignment between the slotted orifices 311a, 311b of the spool valve 310 and the corresponding grooves 323, 325 of the piston connect shaft 320. If the orifices and the grooves have very little overlap, i.e., are mis-aligned, then a large damping force results. This is because the oil, or other viscous liquid, experiences turbulence while passing through an aperture having a small cross-section, as it travels from one chamber 216, 217 to the other 217, 216. Conversely, if the orifices and the grooves have a great degree of overlap, i.e., are aligned, then a small damping force results, as the aperture has a larger cross-section.

The aforementioned assist spring, which is positioned above the motor 221 as shown in FIG. 2, sets the default position of the spool valve 310 in relation to the piston connect shaft 240 in the absence of any force applied by the motor 221. Thus, if no power is applied to the motor, or if power is interrupted, the assist spring 250 will determine the position of the spool valve 310 and thereby control the dampening performance of the damper 210. This arrangement is superior to the zero dampening force which would result without the assist spring 250 if power to the motor 221 was interrupted. The force applied by the assist spring 250 should be adjusted to set the default position of the spool valve 310 at a mid-point of a range of positions traversed by the spool valve 310 during operation of the bicycle. This force selection will result in lower power consumption and greater battery life because it will minimize the movement of the motor shaft 312 during operation of the bicycle.

The ancillary pathway is discussed next. The ancillary pathway comprises a dual check valve 360 having an upper check ball 362, a dual check spring 361 and a lower check ball 363. The dual check spring 361 urges the upper check ball 362 against the opening of an upper check channel 364 which communicates with chamber 216. The dual check spring 361 also urges the lower check ball 363 against a corresponding opening of a lower check channel 365 which communicates with chamber 217.

If the fluid pressure in the lower chamber 217 becomes large enough during compression to overcome the force applied by the dual check spring 361 on the lower check ball 363, the lower check ball 363 moves toward the upper check ball 362 thereby allowing the viscous fluid to flow through the lower check channel 365 and into the ancillary channel 370, where it applies pressure to the feedback plunger 313. Similarly, if the fluid pressure in the upper chamber 216 becomes large enough during expansion to overcome the force applied by the dual check spring 361 on the upper check ball 362, the upper check ball 362 moves toward the lower check ball 363, thereby allowing the viscous fluid to flow through the upper check channel 364 and travel along the ancillary channel 370, again applying pressure to the feedback plunger 313.

The dual check valve 360 serves two purposes. If the pressure applied to the feedback plunger 313 is larger than the threshold value defined by the force of the dual check spring 361, the dual check valve 360 acts to bias the damper 210. Specifically, the force required to move the spool valve 310 will be affected by the amount of pressure applied by the viscous fluid to the feedback plunger 313. If the motor 221 is pushing the spool valve 310 downward, the motor 221 will have to apply sufficient force to overcome the pressure applied to the feedback plunger 313 by the viscous fluid. Conversely, if the motor 221 is pulling the spool valve 310 upward, the motor 221 will be assisted by the pressure applied to the feedback plunger 313 by the viscous fluid.

In addition to biasing the damper valve 218, the dual check valve 360 acts to enable the damper 210 to quickly respond to sudden shocks which could result from steep bumps without waiting for the motor 221 to change the position of the spool valve 310. A sufficiently large pressure applied by the viscous fluid to the feedback plunger 313 will move the spool valve 310 to allow the viscous fluid to flow from the lower chamber 217 to the upper chamber 216 and soften the impact caused by the bump. In contrast, the pressure resulting from normal pedaling of the rider will not be large enough to overcome the force applied by the dual check spring 361. Accordingly, the dual check valve 360 enables the damper 210 to respond to large bumps encountered in the terrain without absorbing the energy resulting from the pedaling of the rider.

In the preferred embodiment, the damper valve 218 will have a body diameter of 0.5 inches and a body length of 3.0 inches. The entire assembly will operate at a maximum ambient temperature of 130 degrees Fahrenheit and consume less than 1.0 watt of power at voltages ranging from 3.0 volts to 12.0 volts. Other operating specifications include a minimum operating frequency of between 300–500 Hz, a maximum flow rate of 0.4 GPM at 1000 psi, a maximum leakage of 0.02 GPM at 1000 psi, and a minimum relief pressure of 500 psi.

The design of the active suspension system allows one to use a low weight motor 221 to control the damper valve 218. In the preferred embodiment, the motor 221 is a moving coil, non-commutated D.C. linear motor (NCDCLM), available from Normag. The NCDCLM consists of a hollow cylindrical coil moving within an air gap created by concentric circular pole pieces. The poles are radially magnetized by rare earth permanent magnets. Applying a D.C. voltage with a first polarity causes the coil to move out with a constant force. Reversing the polarity will cause the coil to retract. The NCDCLM produces a constant and reversible force over the entire stroke and is ideally suited for short stroke (0.01 inches to 5 inches) operation. The NCDCLM has a very fast response time due to a low (<<1 msec) electrical time constant, has a lighter moving member which enables achievement of faster accelerations, and is compact, having an outer diameter as small as 0.5 inches.

Figure 4:
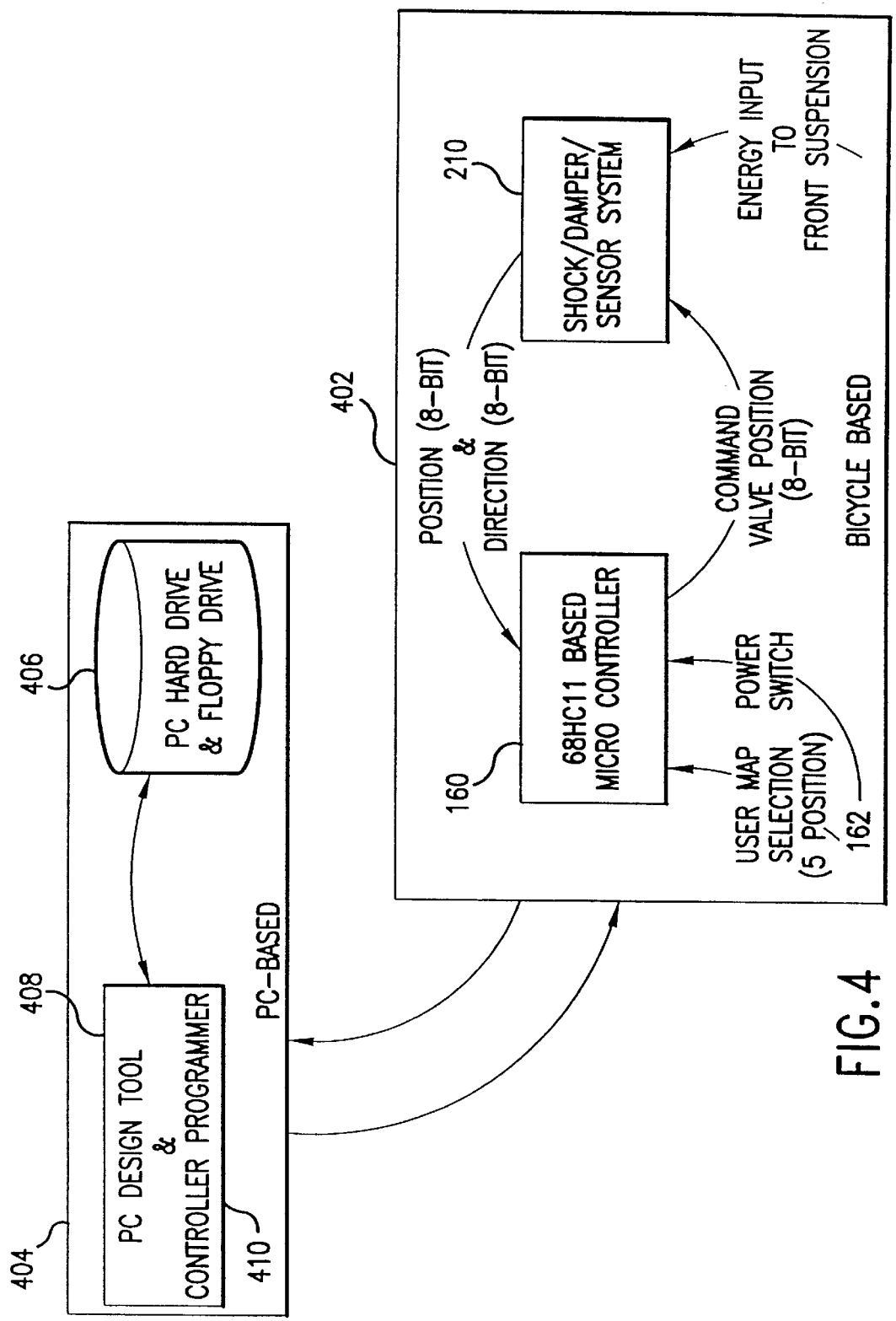
FIG. 4 is a functional diagram of the active suspension system which illustrates the relation among its components.

FIG. 4 provides an operational overview of the overall system contemplated. Specifically, this figure shows the major components of the active suspension system, and the data passed between these components. As seen in FIG. 4, the overall system comprises a bicycle-based component 402, and an external personal computer-based, i.e, a PC-based component 404.

The bicycle-based component 402 includes the damper assembly 210, described above, and the damper controller 160, described further below. It also includes an operator interface 162 associated with the controller and the aforementioned power source 165. The damper assembly 210 senses terrain information by reacting to energy input from bumps encountered while traversing a terrain. This information is presented to the damper controller 160 in the form of information about the position of the inner tube 130 relative to the outer tube 120, and the direction of motion of one relative to the other. This position information is then sent to the damper controller 160.

The damper controller 160 calculates the velocity of the inner tube 130 relative to the outer tube 120 to assess the magnitude of the bump. The calculated velocity and position information is used in conjunction with user-selected control maps to calculate an appropriate degree of force to be applied in response to the bump. The force level is set by the damper controller 160 by sending control signals to the motor 221 which adjusts the position of the spool valve 310 relative to the grooves of the piston connect shaft. These steps are performed many times each second so as to provide real-time active damping.

The PC-based component 404 comprises an external computer having associated memory storage 406. Resident on the PC-based component is a design tool 408 for specifying and downloading control maps (discussed below) to the damper controller 160. Software 410 for governing the operation of the damper controller 160 may also reside here. Furthermore, the damper controller 160 may, upon request by the PC-based system, upload information that it has stored. Downloading and uploading are preferably performed by an infrared data link, although cabling, wireless data links, modems and other data exchange means may also be used.

When a rider encounters a bump, the damper 210 will incur a compressive input force which will cause the outer tube 120 and the attached damper 210 to slide axially toward the inner tube 130 (compression). This compression will cause the pressure below the piston connect shaft 240 in the lower chamber 217 to become greater than the pressure above the piston connect shaft 240 in the upper chamber 216. This difference in pressure will cause the viscous liquid to move along the primary pathway from the lower chamber 217 to the upper chamber 216. If this difference in pressure is large enough to overcome the force applied by the spring 361 on the lower check ball 363 of the dual check valve 360, the viscous fluid will also flow along the ancillary channel 370 to apply pressure to the feedback plunger 313.

The flow of the viscous liquid from the lower chamber 217 will allow the outer tube 120 to continue to move axially toward the inner tube 130. In other words, the tube assembly 120, 130 will continue to compress. As described previously, the sensor 201 produces two waveforms on two electrical connections 223 which are connected to the damper controller 160. These waveforms encode information on the relative position and the direction of movement of the outer tube 120 with respect to the inner tube 130. The damper controller can then use this information to calculate relative velocity. Collectively, this information reflects the terrain conditions encountered. For example, the relative velocity between the inner and outer tubes will be greater when the bicycle passes over a larger bump than when it passes over a smaller bump. The damper controller 160 uses the velocity, position and direction information to control the dampening performance of the damper assembly 210 in accordance with the rider's dampening preferences.

Figure 5:
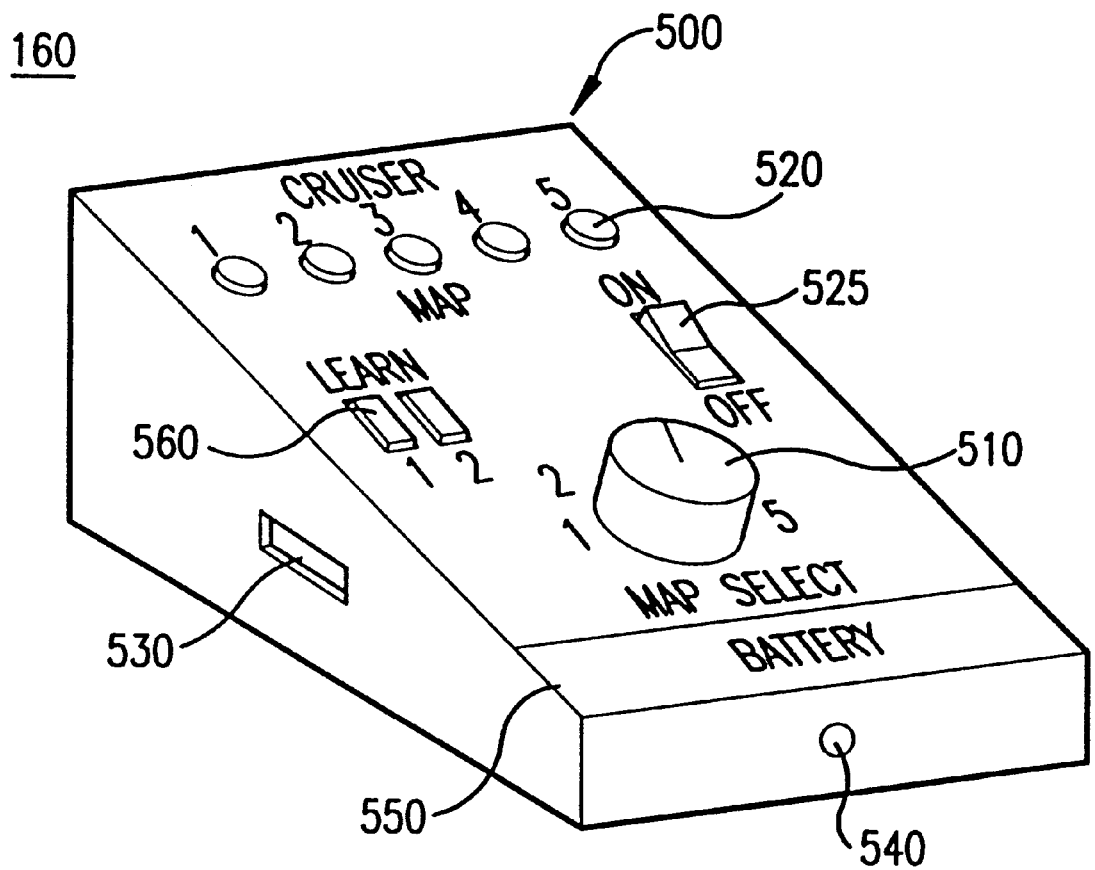
FIG. 5 is an external view of the damper controller.

FIG. 5 shows the external view of the damper controller 160, revealing the bicycle-based user interface 500 to the active damping system. The interface 500 is provided with a selection switch 510 which allows a rider to select one of five control maps (described further below). It should be noted, however, that an arbitrary number of control maps can be provided, if desired.

The interface also has a display comprising a series of LEDs 520 to indicate which of the five control maps has been selected. In addition, The LEDs may individually, or collectively, be strobed or otherwise coded to designate special conditions. Alternate displays, such as liquid crystal devices, displaying this information, along with other status data may be used in place or, or in addition to, the LEDs.

The interface 500 is also provided with a socket 540 into which an electrical connector may be plugged. The electrical connector may be used to bring position and direction information from the sensor 201, and activate the motor 221. An On/Off SPDT rocker switch 525 is provided for the rider to turn on and turn off the damper controller 160.

Figure 6:
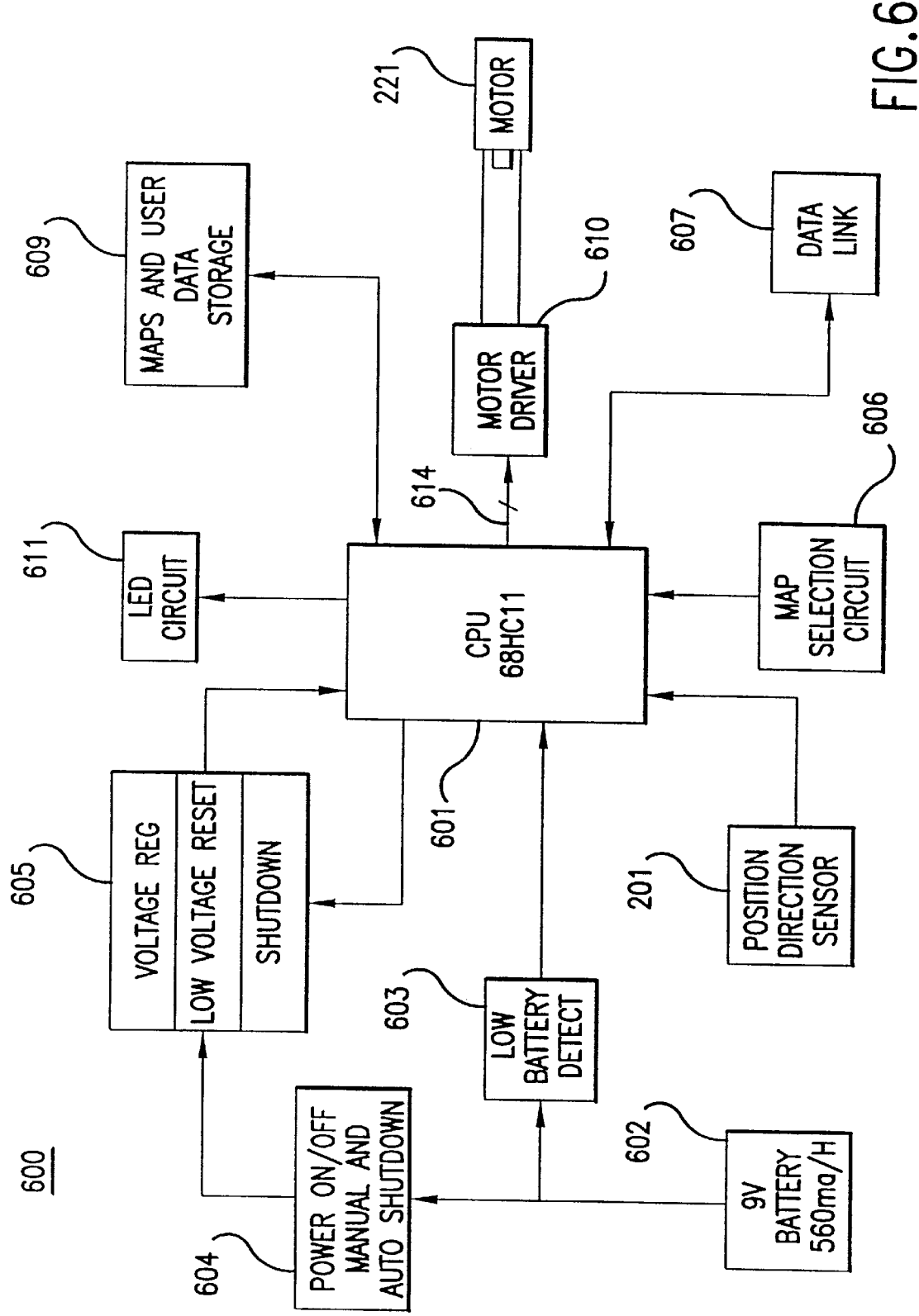
FIG. 6 is a functional diagram of the damper controller.

A battery chamber 550 associated with the damper controller 550 houses a battery which supplies the required power to the damper controller circuitry 600 of FIG. 6.

Finally, the interface is provided with a pair of learn switches 560 which can be activated to temporarily store data collected from traversing a particular terrain. This data may be temporarily stored in DRAM for subsequent uploading to an external computer. An infrared (IR) port 530 facilitates communication with the PC-based component to upload such data, and also to download control maps and other software. As stated above, other data links may be used in place of the IR port.

FIG. 6 shows a block diagram of the damper controller circuitry 600. When in use, the damper controller 160 draws a maximum of 60 mA of current and the motor draws a maximum of 300 mA. Power to the controller circuitry is provided by a 9 volt battery 602. The power control, manual and automatic shutdown circuit 604 cycles the damper controller 160 between an active mode and a sleep mode to conserve power and extend battery life. A low battery detect circuit 603 detects a decrease in the voltage supplied by the 9 volt battery 602 below an acceptable voltage. In the preferred embodiment, the acceptable voltage is 7.2 volts. A voltage regulator 605, implemented as Part Number LP2951ACM, accepts a poorly specified and possible fluctuating DC input voltage and produces from it a constant, well specified output voltage that can then be used as a supply voltage to the remainder of the circuit.

A map selection circuit 606 encodes the control map selection made by the rider with the map select switch 510. In the preferred embodiment, the rider can select one of five control maps. Accordingly, the map selection switch 510 causes the map selection circuit to output three bits to represent the five possible values. In the preferred embodiment, the map selection circuit 510 is a 5 position rotary Binary Coded Decimal (BCD) switch available from Grayhill (Part Number 26ASD22-01-1-AJS). As previously discussed, the map select switch 510 and the map selection circuit 606 can be expanded to support more than 5 control maps if necessary.

An Electrically Erasable Programmable Read Only Memory (EEPROM) 609, Part No. X25642, available from Xicor. Alternate forms of non-volatile memory, such as ROMS, PROMS and the like, may also be used, when erasability is not needed. In such case, the data residing on these units will be hardwired, offering reduced flexibility. EEPROM 609 stores the control maps, and configuration data for the system. The configuration data includes sleep and kill time parameters which are used to automatically move the damper controller 160 to a sleep state and to automatically deactivate the damper controller 160. The EEPROM 609 also stores calibration data and peripheral driver information. The calibration data is used to translate data in the control maps to voltage controls for different damper valves 218.

As explained above, the sensor 201, which is located on the outer tube 120 of the damper 210, outputs two signals which provide position and direction information regarding the movement of the inner tube 120 relative to the outer tube 120. The sensor output is directly connected to the processor 601. If necessary, buffers and/or inverters may be interposed between the sensor 201 and the processor.

An Infra-red (IR) link 607 facilitates data transfer between the damper controller 160 and the external computer. In the preferred embodiment, the IR link 607 uses an RS-232 interface with a Hewlett Packard InfraRed Data Association chip set (Part Numbers HSDL-1000 and HSDL-7000). As explained above, cabling and other wireless systems may be used in place of the IR data link.

At the heart of the damper controller circuitry 600 is a central processing unit (CPU) 601, which is implemented as a programmable microprocessor. In the preferred embodiment, processor 601 is Part No. 68HC11, available from Motorola.

Processor 601 accepts sensor input from sensor 201, command input from interface 500 and, in response thereto, outputs a damper control signal to the motor 221 via motor driver 610. The processor 601 also receives status information from the low battery detect circuitry 603, the interface 500 and the data link 607, when used. This status information is stored in a register belonging to the display driver circuit 611, and is output on the display 520. The register can be implemented as a latch, such as a 74AC573. Finally, the processor 601 also directs information downloaded from the data link 607, such as control maps, to the EEPROM 609. And, if the data link 607 is appropriately configured to output information, the processor 601 can upload data from a DRAM, or other volatile memory, via the data link 607.

When a user selects one of the control maps using map selection switch 510, the processor 601 sets a flag to identify which of the control maps, stored in the EEPROM 609, is to be used. The processor then monitors the inputs from the sensor 201 and determines the present velocity and position of the inner tube 120 relative to the outer tube 120. Using this information, the processor consults the selected control map to determine the desired instantaneous damping force (DIDF) to be applied at that instant to counter the effects of the bump then being experienced.

The processor 601 uses the desired instantaneous damping force information, along with damper calibration data, to calculate and output appropriate damper control signals 614. The damper control signals 614 contain magnitude and polarity information which are presented to a motor driver 610, for ultimately operating the motor 221.

The motor driver 610 converts the damper control signals 614 into a voltage of the appropriate magnitude and polarity to be applied to the motor 221. For this, the motor driver 610 comprises a digital-to-analog converter (DAC), Part No. MAX538, manufactured by Maxim Integrated Products of San Gabriel Calif., which has a serial port, and an H-bridge circuit, Part No. A39525W. The DAC converts a digital damper control signal 614 into an analog signal to be applied to the H-bridge circuit, and the H-bridge circuit uses this signal, along with polarity information, to drive the motor 221.

As previously explained, the motor adjusts the position of the spool valve 310. This, in turn, controls the size of the aperture formed by the alignment of the spool valve's circumferential orifices 311a, 311b with the grooves 323, 325 of the piston connect shaft 240. It is this aperture which controls the flow of viscous liquid between the chambers 216, 217 of the damper 210, thereby providing the damping force. This process is repeated many times per second.

The dampening performance of the damper controller 160 is determined by selecting one from among several (five, in the preferred embodiment), control maps. As explained above, the control maps are developed on an external computer and downloaded to the damper controller.

Figure 7A:
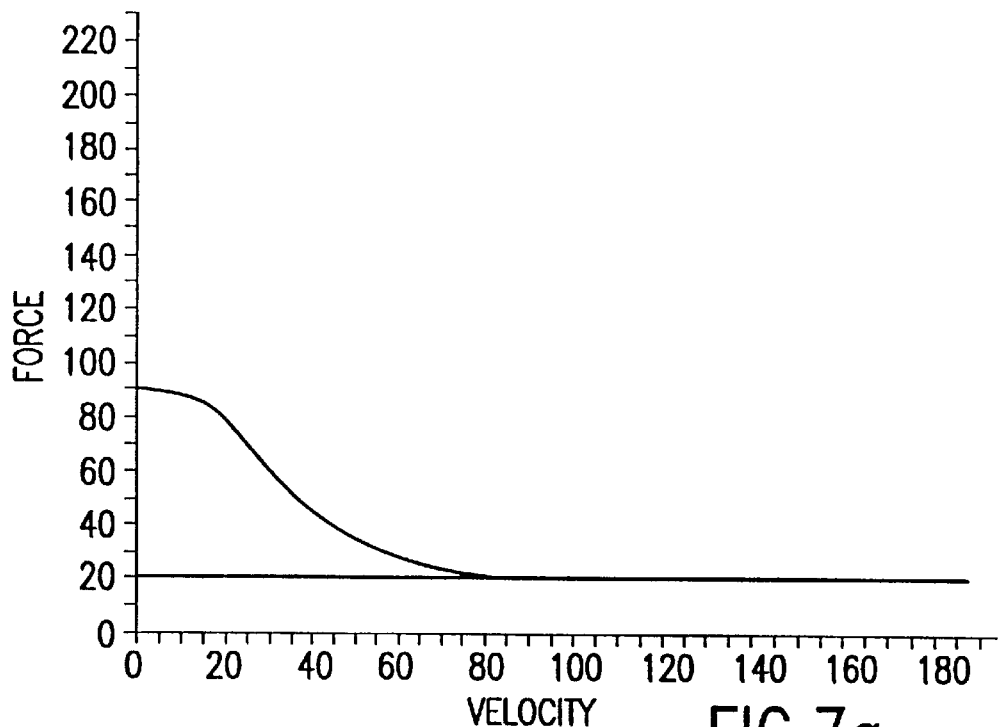
FIGS. 7a–7d display graphical representations of the control maps.
Figure 7B:
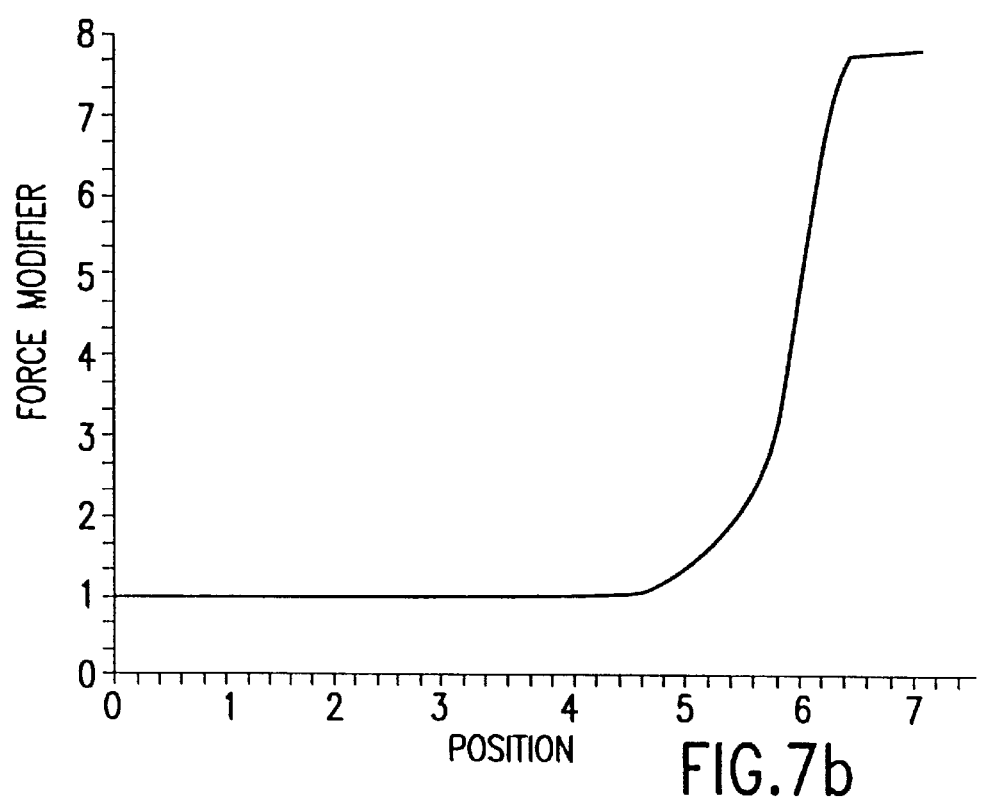
Figure 7C:
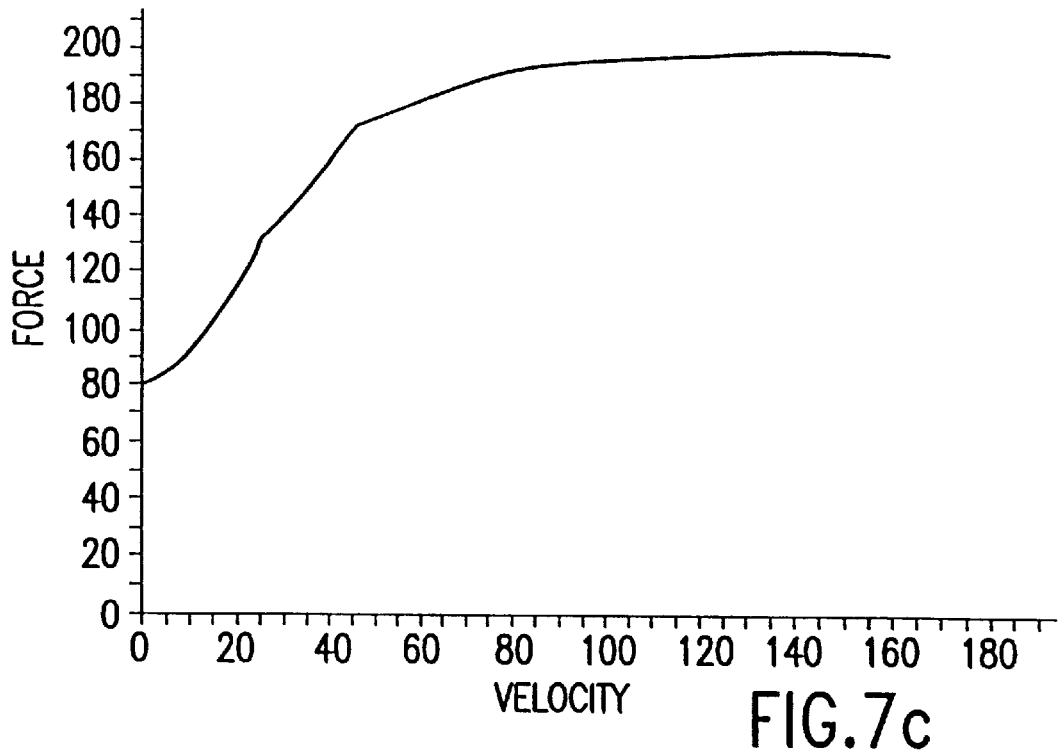
Figure 7D:
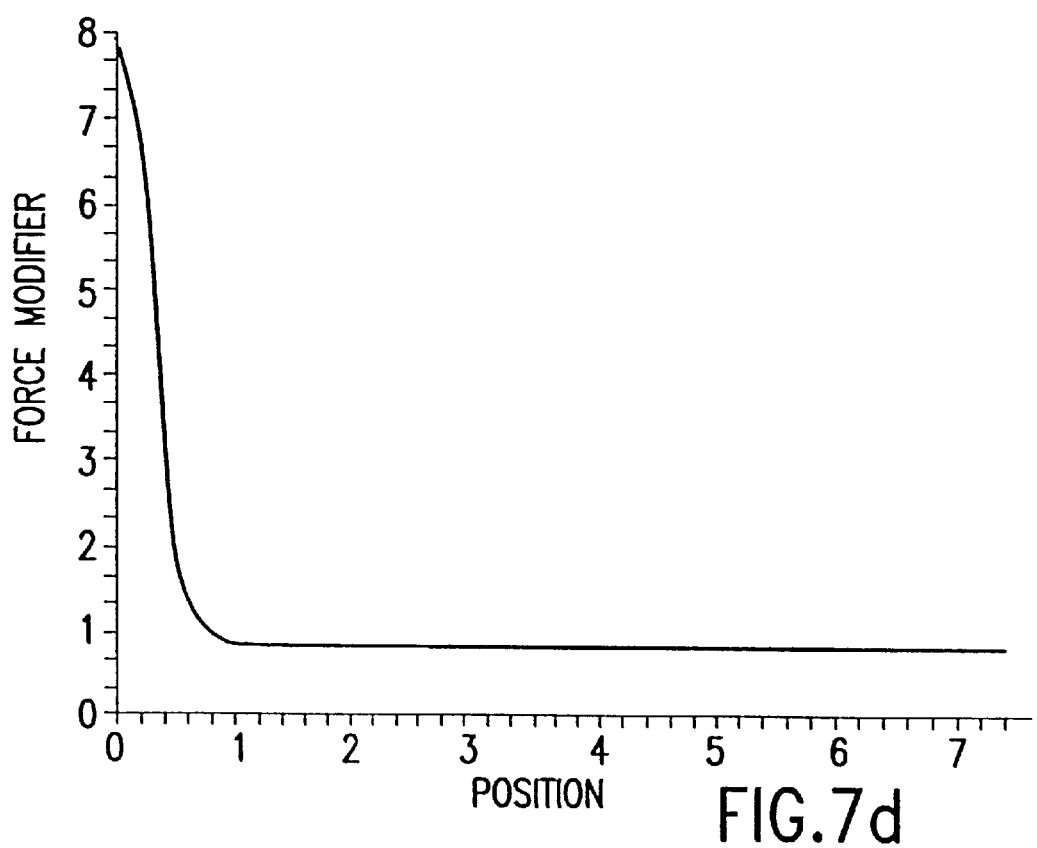
Figure 8:
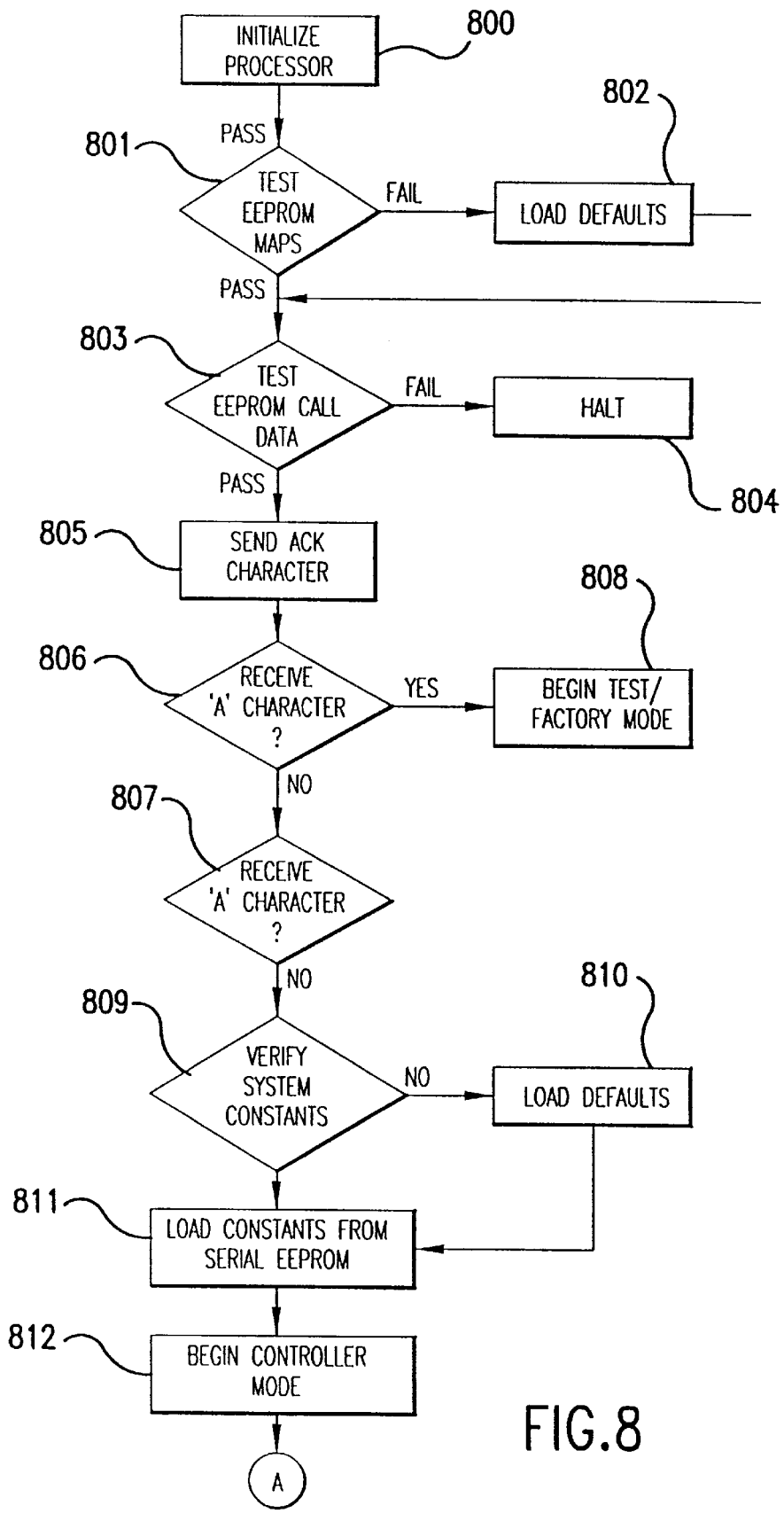
FIG. 8 is a flowchart describing the initialization of the damper controller.

FIGS. 7a–7d display graphical representations of a sample control map which is used to determine the dampening performance of the damper 210. Each control map comprises two pairs of mappings, each mapping comprising a monotonic curve. One pair, FIGS. 7a, 7b are used when the inner and outer tubes are sliding towards each other (compression), while the other pair, FIGS. 7c, 7d, are used when the tubes are sliding away from each other (expansion). In each pair, one mapping (7a, 7c) presents the target damping force, given a velocity reading, while the second mapping (7b, 7d) presents a modifier to the target damping force.

The damping operation is explained with reference to FIGS. 7a and 7b. FIG. 7a shows the target damping force as a function of the relative velocity (in cm/sec) of the outer tube 120 with respect to the inner tube 130 for compression.

FIG. 7b shows a target damping force modifier as a function of the relative position (in cm) of the inner 130 and outer 120 tubes with respect to some initial position.

When the tube assembly 120, 130 is compressing, the processor 601 computes the damper control associated with a given relative velocity and relative position based on the information as shown in FIGS. 7a and 7b. The force value is first read from FIG. 7a, and this value is multiplied by the force modifier read from FIG. 7b. This produces the desired instantaneous damping force (DIDF), given the relative velocity, position and direction of the two tubes.

The processor then sets the magnitude of the voltage applied to the motor 221 using the DIDF. This is done by using the calibration data stored in the EEPROM 609. The calibration data may take many forms. For instance, it may simply be a look-up table which maps a DIDF to a particular voltage output to be applied to the motor driver 610. It may, instead, be a plurality of parameters used, along with the DIDF, in a more complex generating function, such as a linear, or even a nonlinear, polynomial, or the like.

Whichever form it takes, the calibration data is specific for a particular damper assembly 210, and is heavily dependent on the characteristics of the motor 221, the size of the tubes 120, 130, and, of course, the damper valve 218. Therefore, calibration, which may include the determination of the various parameters, and possibly also the generating function, is preferably performed at the time of manufacture of the damper assembly 210. During calibration, a strain gauge, or similar, is used to measure the output force of the assembly 210 as the input voltage to the motor is adjusted, under different conditions of relative velocity and relative position. These data can then be used to develop a model of the damper assembly, using known techniques.

If the velocity is very high, it means that a large bump has been encountered. In the mapping shown in FIG. 7a, if the velocity is very high, very little damping force is applied, and so the aperture is large. Thus, the viscous fluid is allowed to flow freely from chamber 217 to chamber 216. This is because one wants to dissipate the large amount of energy and reduce the shock to the rider from the large bump. Lower velocities mean more gradual bumps. Thus, in FIG. 7a, the target damping force is somewhat larger, since the shock to the rider is somewhat lower. It should be noted, however, that in FIG. 7a, the minimum target force is about 20. This is the force applied by the pre-biasing assist spring 250, discussed above.

FIG. 7b shows that the force multiplier is very high during compression when the inner and outer tubes have traveled to an extreme. This is because one does not want the inner and outer tubes to "bottom out" relative to each other. Multiplying the target damping force (i.e., closing the aperture), reduces the chances of this happening.

FIGS. 7c and 7d contain similar information as graphs FIGS. 7a and 7b, respectively, except that 7c, 7d are used during expansion.

As presently configured, each control map is implemented using a look-up table in which narrow ranges of velocities or positions are mapped onto values for target damping forces and force multipliers. The control maps may also be implemented as algebraic functions which calculate these values. In the preferred embodiment, however, the control maps occupy 1096 bytes of memory, which includes 64 bytes for miscellaneous data including checksum results. Thus, for five control maps, approximately 5.5 Kbytes of EEPROM 609 space is needed. The checksum is the sum of a group of data items associated with the group for checking purposes.

The CPU 601 references checksum results to verify the correctness of the data in the control maps.

FIGS. 8–11 explain the operation of the damper controller circuitry 600 of FIG. 6. The flowchart in FIG. 8 describes the operation of the damper controller 160 when it is first activated.

In step 800, the Central Processing Unit (CPU), which is implemented as the processor 601, initializes the processor and begins to test memory.

Next, in step 801, the processor 601 tests the data in the EEPROM 609 associated with the control maps. The control map data and checksum data is examined to determine whether it is intact. The processor 601 verifies each control map by comparing the computed 16 bit unsigned checksum for the control map with the checksum data which is stored in the EEPROM 609. If the two quantities match, the processor lights up the LED 520 corresponding to that control map. This informs the user that control map is intact. That LED is then turned off and the testing continues. If any control map fails the checksum test in step 801, control flows to step 802.

In step 802, the processor 601 will use a default control map which is available as a software module. If a default control map is used, the CPU 601 will light every LED on the display 611 except the one corresponding to the default control map.

Control eventually passes to step 803. In step 803, the processor 601 will perform the checksum test on the calibration data. If the checksum test fails, control flows to step 804 and the processor halts. When it halts, all LEDs 520 will be lit to indicate an error condition. If the calibration data passes the checksum test in step 803, control flows to step 804.

In step 804, the processor checks to see whether there is a connection to an external computer. For this, processor 601 sends an ACK signal to the external computer over the IR link 607. If the external computer sends back a NACK signal in step 806 to the damper controller 160, the damper controller 160 will enter test/factory mode 808. In the test/factory mode, the external computer remotely controls the damper controller 160. Control maps, configuration data and calibration data may then be downloaded to the damper controller. The external computer sends control maps (FIGS. 7a–7d), calibration data and configuration data to the damper controller 160 using a standard packet protocol. The damper controller 160 will store this data in the EEPROM 609. After entering the test/factory mode 808, the damper controller 160 must be powered off before it can enter controller mode. If the processor times out while awaiting a NACK signal 806, 807 from the external computer, it means that the system is in operating mode, and so control flows to step 809.

In step 809, the processor 601 performs a checksum verification on the system constants 809 in the EEPROM 609. If this fails default values will be loaded in step 810. After system constants are either verified or loaded, any other remaining constants are loaded in step 811, and control passes to step 812, in which the active damping system enters the controller mode.

Figure 9:
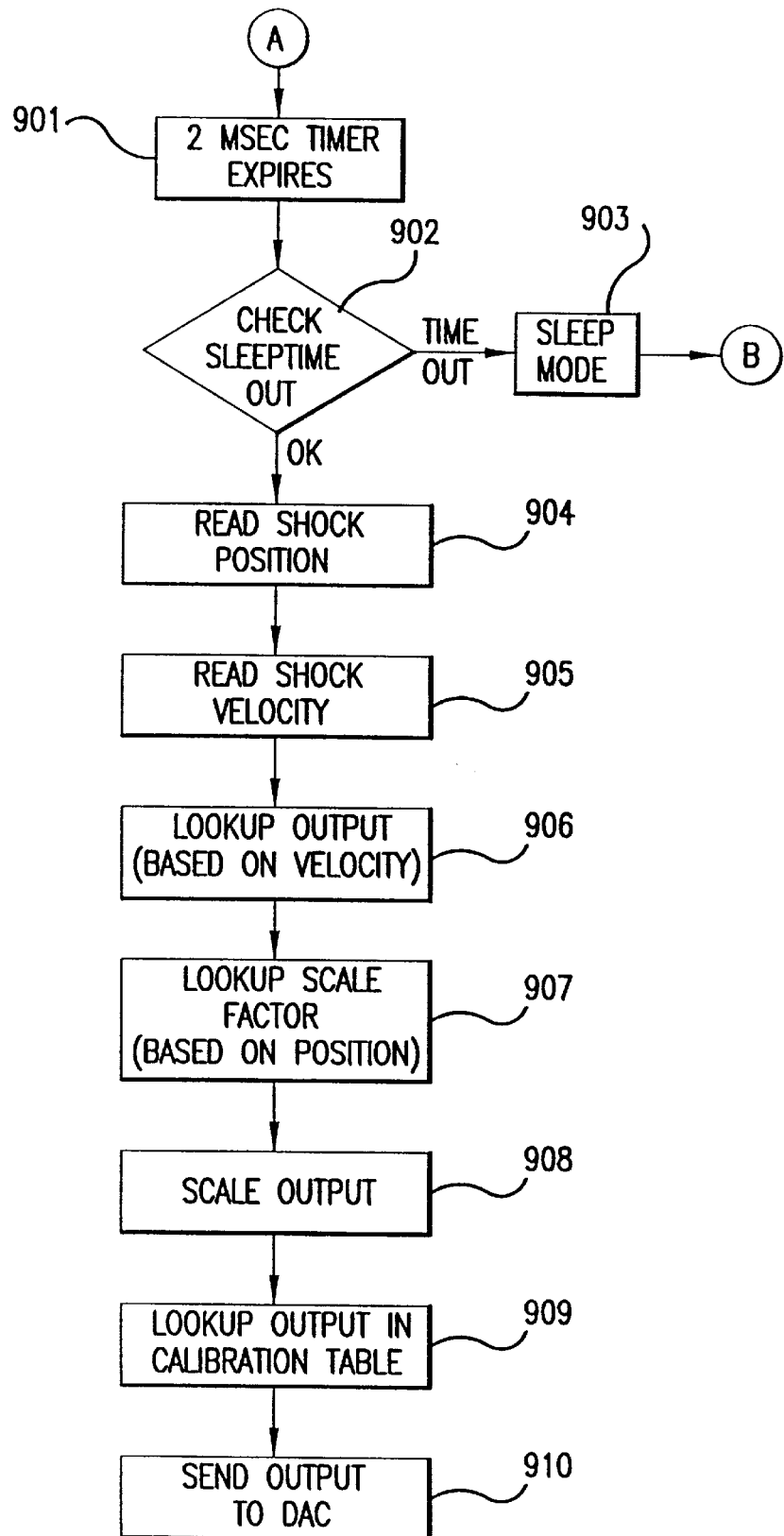
FIG. 9 is a flowchart describing the overall operation of the damper controller.

As shown in FIG. 9, upon entry into the controller mode, the system pauses for 2 msecs in step 901 for all activity to settle before continuing by proceeding to step 902, where the system beings a sleep/monitor cycle.

Figure 11:
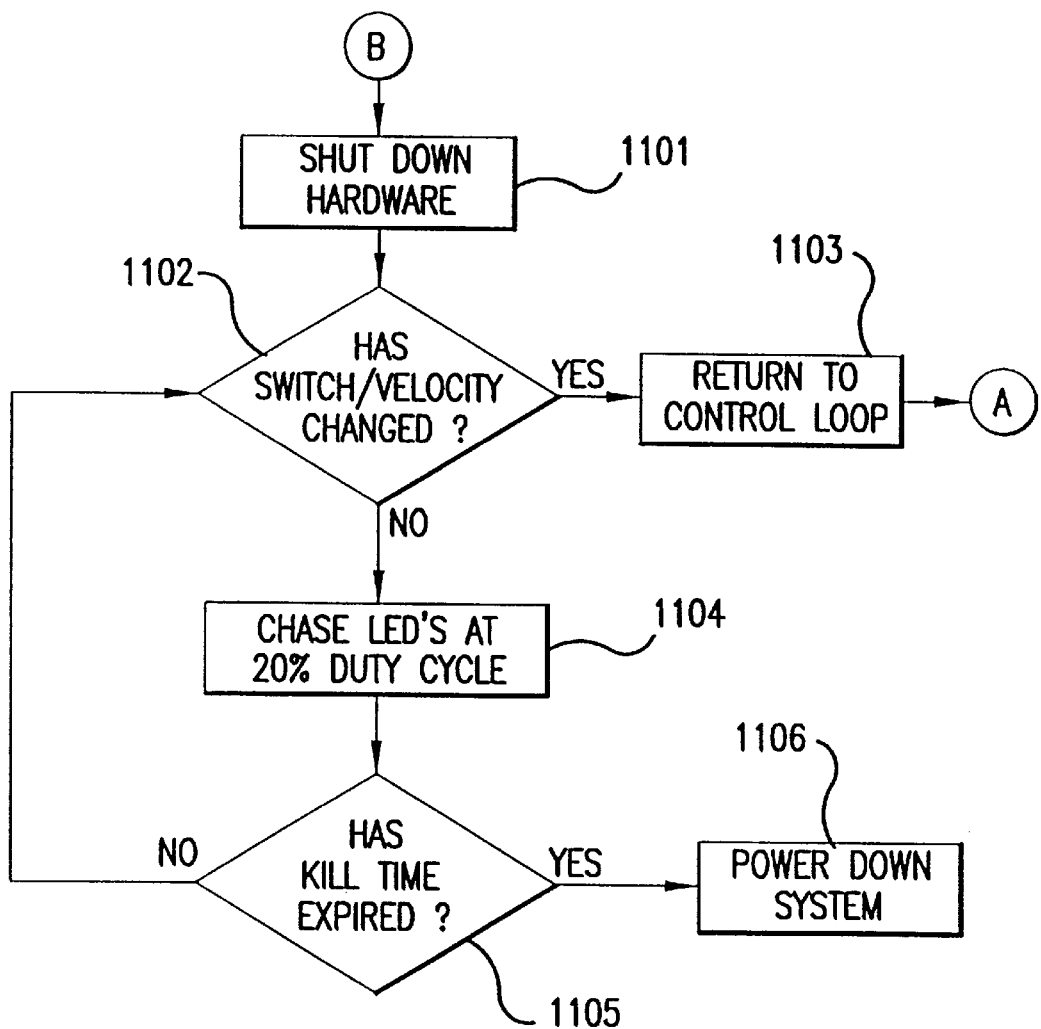
FIG. 11 is a flowchart describing the operation of the damper controller in sleep mode.

In step 902, the processor 601 determines whether an internal sleep timer has timed out. If so, the processor goes to sleep for a predetermined length of time in step 903. As illustrated in FIG. 11, the sleep timer will be reset if the relative velocity received from the sensor 201 is non-zero. The sleep timer will also be reset if the rider changes the control map selection switch 510. If the sleep timer has not yet expired, monitoring continues with steps 904–910.

Figure 10:
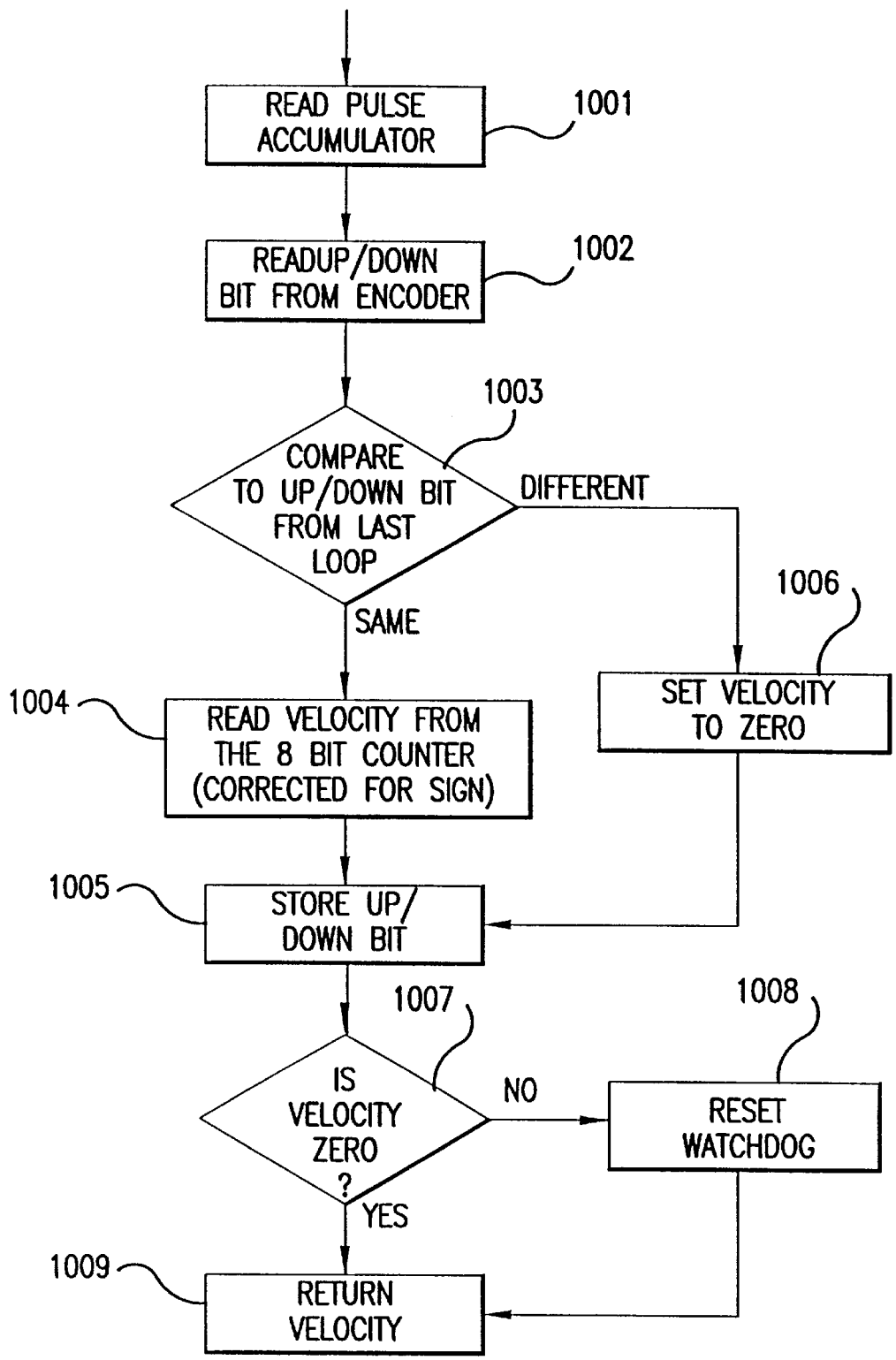
FIG. 10 is a flowchart describing the calculation of the relative velocity of the inner and outer tubes of the damper by the damper controller.

First, the relative damper position 904 and the relative damper velocity 905 are calculated, as shown in FIG. 10. In step 906, the target damping force and then, in step 907, the force modifier are retrieved, based on the selected control map. In step 908 the DIDF is calculated. In practice, the target force is an 8 bit value, which is then scaled by the force modifier, another 8 bit value. The result of this scaling is then normalized by shifting the resulting bits so as to produce an 8 bit DIDF.

In step 909, the calibration data is used to form the damper control signals 614 from the DIDF. Although different calibration data are needed for different models of damper assemblies 210, there should be little variation between damper assemblies having the same design. The calibration data allows the same control maps to be used with same model damper assemblies. Of course, the same control maps may be used with other damper assemblies if calibration data for those other damper assemblies were available. To ensure that the system can be used with different damper assemblies, it may be expedient to load calibration data for a number of different assemblies, and then have the processor 601 electronically monitor which assemblies has been installed through an additional port or interface.

Finally, in step 910, the damper control signals 614 are presented to the motor driver 610 to ultimately run the motor, as explained above.

FIG. 10 illustrates the calculation of the relative velocity between the inner 130 and the outer 120 tubes (step 905). In step 1001, the processor 601 reads the pulse accumulator, which contains a pulse for each reflecting mark encountered by the sensor 201.

In step 1002, the processor 601 then reads the second waveform from the sensor 201 which encodes the direction of the relative movement between the two tubes. The algorithm determines the sign of the damper velocity by referencing Table 1, shown below.

| Previous State | Current State | Velocity |
| --- | --- | --- |
| High | High | Positive (Bump) |
| Low | Low | Negative (Rebound) |
| Low | High | 0 |
| High | Low | 0 |

TABLE 1—LOGIC TABLE FOR DAMPER DIRECTION

In step 1003, the present up/down bit from this second waveform is compared with the previous one. If they are different, it means direction has changed, and so the velocity at that instant is set to zero in step 1006.

If they are the same, it means that the one tube is traveling in the same direction as before, relative to the other tube. Therefore, the velocity of this travel is determined in step 1004. The algorithm computes the damper velocity based on the number of position ticks as represented by pulses in the position information sent by the sensor 201 which occurs in the time that elapsed between two control loop iterations 1004. More particularly, the damper velocity is computed as the number of position ticks multiplied by the distance between reflecting marks on the code strip divided by the control loop period. This scheme allows the system to measure velocity in steps of 0.83 in/sec when the minimum distance between the reflecting marks on the code strip is 0.0013 inches and the control loop period is 0.002 seconds.

In step 1005, the current up/down bit is stored for future comparison with the next up/down bit. After this, the velocity is checked in step 1007 to see if it is zero. If it is non-zero, the algorithm resets the watchdog timer to zero in step 1008 to prevent the system from going into sleep mode. Resetting the watchdog timer will also bring the system out of the sleep state, had the device been sleeping.

Finally, in step 1009, the algorithm returns the computed velocity to the main control loop of the damper controller 160 where it will be used to compute the damper control signals, as explained above.

FIG. 11 presents the sleep mode. Upon entering sleep mode, the circuit 600 system first turns off all peripherals in step 1101. These include such items as the data link 607, the motor driver 610; the LED circuit 611 is at a 20% duty cycle.

The system timer is a simple interrupt-driven counter running at the slowest tick available on the processor 601. This allows the system to have very long time-outs should the system require it, and reduces the overhead associated with maintaining the timer.

In step 1102, in this dormant mode, the systems checks to see if there is any input from either the switches 525, 560 or the sensor 201. If so, control flows to step 1103 to resume the controller mode. If not, the LEDs are operated at a reduced capacity, as indicated by step 1104, after which the system checks to see whether the sleep timer has timed out in step 1105. If not, the switches and sensor monitoring continues. If the sleep timer has timed out, control flows to step 1106 and the system is powered down. This would typically happen when the rider forgets to turn off the system with the On/Off SPDT rocker switch 525.

Software on the external computer provides the user with a friendly environment which includes a graphical user interface (GUI) to enable the rider to rapidly define new control maps. Control maps may be defined by creating a pair of vectors comprising mappings. This can be done by drawing a mapping of a desired shape using a cursor, light pen, track ball, or the like. Alternatively, one may create mappings using mathematical equations. Other ways to create these mappings may also be used. The resulting control maps may be stored on a memory of the external computer when they are created. They may then later be downloaded to the damper controller 160 via the data link 607.

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A valve assembly comprising:
   an outer member aligned along a longitudinal axis, said outer member comprising:
   a first wall, said first wall extending along said longitudinal axis;

first and second grooves formed on an inner surface of said first wall, said grooves being spaced apart along said longitudinal axis by a first distance; and at least one channel passing between each of said grooves and an exterior surface of said first wall;

an inner member nested within said outer member, said inner member comprising:

a second wall extending along said longitudinal axis, an interior cavity defined within said second wall; and first and second orifices formed in said second wall, said orifices being spaced apart along said longitudinal axis by substantially said first distance; and an adjustment member connected to one of said inner and said outer members and arranged to move said one of said members relative to an other of said members along said longitudinal axis such that said grooves and said orifices overlap by a selected degree.

2. A valve assembly as in claim 1 further comprising:

a secondary channel extending through said outer member and aligned along said longitudinal axis between a third orifice and a fourth orifice of said outer member;

a spring positioned within said secondary channel having a first end and a second end; and a first ball positioned on said first end of said spring and a second ball positioned on said second end of said spring such that said spring applies a force to said first ball toward said third orifice and to said second ball toward said fourth orifice.

3. A valve assembly as in claim 2 further comprising a plunger attached to said adjustment member and positioned within said interior cavity of said inner member wherein said plunger operates with said secondary channel to bias said valve assembly.

* * * * *